Dec. 30, 1952 D. W. HILL 2,623,685
PLASTIC COVER FOR WAXED PAPER CONTAINERS
Filed Oct. 3, 1947
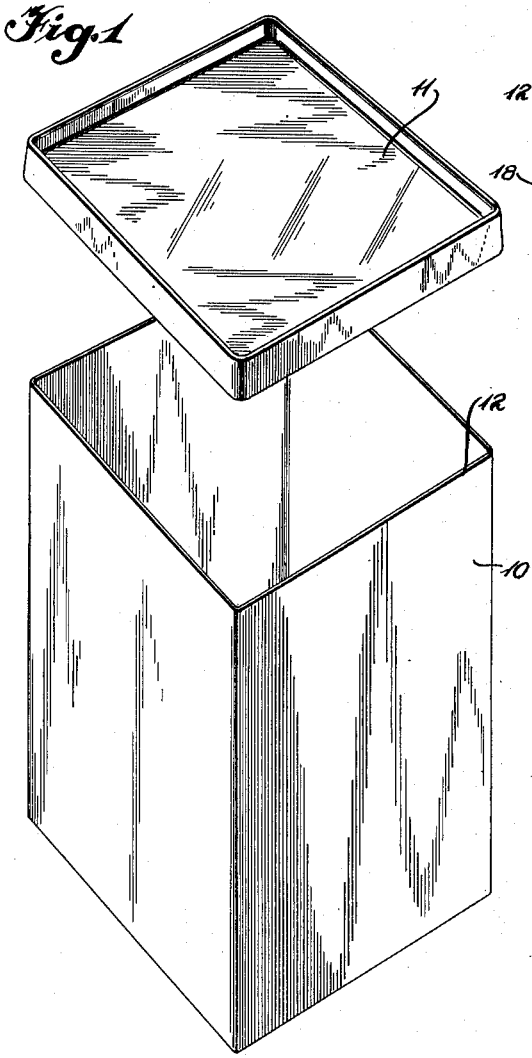
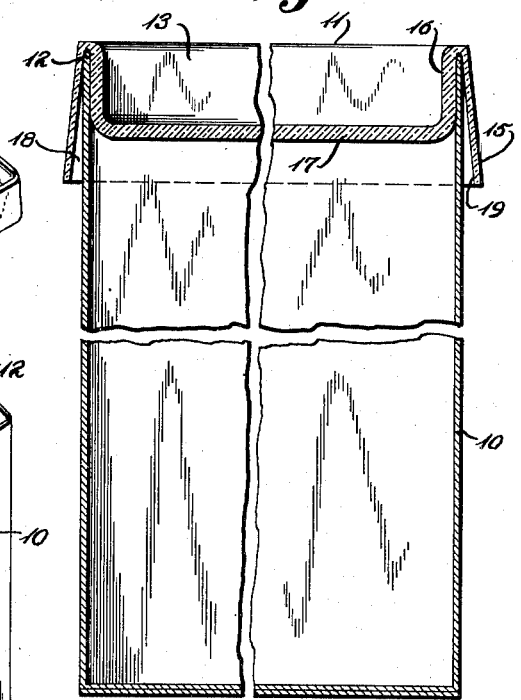
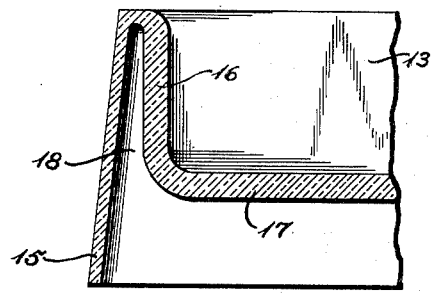
INVENTOR:
Donald W. Hill,
BY
Cushman, Darby & Cushman
Attorneys.

Patented Dec. 30, 1952

2,623,685

UNITED STATES PATENT OFFICE 2,623,685

PLASTIC COVER FOR WAXED PAPER CONTAINERS

Donald W. Hill, Decatur, Ill., assignor to Crown Cork Specialty Corporation, Decatur, Ill., a corporation of Illinois Application October 3, 1947, Serial No. 777,726

1 Claim. (Cl. 229—43)

The present invention relates to containers which are particularly useful for commercial and home freezing lockers.

At the present time, paper containers are principally employed in freezing lockers and are available either as round or square types. The round type takes up excessive space in the locker and its use, therefore, is objectionable. On the other hand, the square type containers are provided with a small opening in the top to receive a round metal plug closure, and are not entirely satisfactory because it is necessary to destroy or distort the container before the frozen contents can be removed.

An important object of this invention is to provide a cover which is detachably and frictionally held in sealing relation with the top peripheral wall portion of a square or other polygonal shaped container. A tight seal is provided but the cover may be removed and replaced on the same container or re-used on other containers, and it is unnecessary to destroy or mutilate the container which also may be continued in use or re-used in the freezing locker.

An equally important object of the invention is to provide a container having a cover of transparent plastic material, preferably polystyrene, so that in use, the contents may be viewed by merely looking through the cover.

Another object of the invention is to provide a cover which will serve to rigidify the container against collapse.

A further object of the invention is to provide a cover which will be so constructed as to provide a pry-off portion.

Preferably, the improved transparent polygonal shaped cover is made of polymerized styrene having a high molecular weight, for example, in accordance with the patent to Ostromolensky, No. 1,683,402, and may be produced by the method described in the patent to Wulff and Dorrer, No. 2,077,542. The polystyrene cover can be cleaned and sterilized and re-used many times so that the housewife or commercial locker owner will only have to buy the container as a replacement when necessary and not the entire package. Also, the polystyrene plastic is particularly useful for the covers since this material improves in strength with reduction in temperature, and, hence, is admirably adapted for both commercial and home freezing lockers. Moreover, the polystyrene plastic is tasteless and odorless which, of course, is of particular significance where the container is used for keeping foodstuffs.

The transparent polygonal shaped cover of the present invention includes a polygonal central dished portion having an integral peripheral continuous skirt overlying the outer surface of the continuous wall of the dished portion and depending downwardly and outwardly with respect to said wall. There is, thus, defined between the inner surface of the depending skirt and the outer surface of the side wall of the dished portion a tapering channel which frictionally receives the upper peripheral edge portion of the container in sealing relation. The bottom and continuous side wall of the dished portion which are disposed within the upper edge portion of the container are relatively thicker than the overhanging skirt portion of the cover and thereby reinforce the container wall against collapse. The skirt depends outwardly and downwardly away from the dished portion substantially below the bottom of the dished portion to an extent whereby its free edge will form a pry-off means for the cover.

Referring to the drawings,

Figure 1 is a perspective view of a square container and a cover therefor in accordance with this invention, the cover being removed;

Figure 2 is a sectional view through the container with the cover detachably and frictionally applied thereto in sealing position and showing how the extended portion of the skirt of the cover provides a pry-off means, and Figure 3 is a detailed sectional view illustrating the difference in thickness between the central dished portion of the cover and the overhanging skirt, and also illustrating the tapering channel defined by the skirt and wall of the dished portion for frictionally receiving the top edge portion of the container.

In Figure 1, the box or container is indicated at 10. It is preferably square and made of paper or cardboard with a customary wax or paraffin coating on its interior and exterior walls. The cover is indicated at 11 and is square to receive the top edge portion 12 of the container in a manner which will now be described.

While I have illustrated a square container and cover, it is to be understood that the container may be of any polygonal form, e. g., triangular, square or rectangular, and the cover will have a corresponding shape to receive the top edge portion 12 of the container.

The cover 11 is provided with a central square dished portion 13 and an integral outwardly and downwardly depending continuous skirt 15 overlying the continuous side wall of the dished portion and depending below the bottom thereof. In casting or molding the cover from plastic such as polystyrene, the side wall 16 and bottom wall 17 of the dished portion are made thicker than the depending skirt 15, as best shown in Figure 3. The skirt 15 defines with the side wall 16 of the dished portion a tapering channel 18 to receive the peripheral top portion 12 of the container, as shown in Figure 2.

Referring to Figure 2, the continuous top portion 12 of the container is detachably received within the channel 18 and the extent of taper is such that the more firmly the cover is pressed on the top portion 12 of the container, the tighter will be the frictional seal between the top portion 12 and the channel walls 15 and 16. The lower depending portion of the skirt 15, as best shown in Figure 2, is disposed outwardly of the container when applied thereto so that this lower edge will form a pry-off grip or a space 19 will be provided between the container wall and the skirt 15 whereby the cover may be readily pried from the container by means of the fingers or a suitable tool without distorting the container or cover.

The thickened bottom 17 and continuous side wall 16 of the polygonal shaped dished portion 13 impart a number of advantages, namely they act to rigidify the cover and thereby preserve its shape and fit; also when the dished portion is positioned within a container, as shown in Figure 2, the thickened side wall 16 closely engages the inner wall surface of the upper portion 12 of the container to fortify the same against collapse; further, the thickened walls of the dished portion enable the skirt 15 to be made relatively thin so that it is flexible and resilient, and thereby the walls of channel 18 will frictionally receive the top portion 12 of the container to form a tight seal, and finally, the thickened portions 16—17 afford a support for leverage exerted on the skirt 15 to remove the cover and only a minimum of force is needed to thus pry the cover off of the container.

While I have described the cover as made from polystyrene, it is to be understood that other synthetic resins may be employed provided they are transparent, will withstand freezing temperatures, and have other desirable properties of the polystyrene, as herein described.

I claim:

In combination with a polygonal shaped container, a removable one piece polygonal cover of plastic material for said container, said cover including a centrally disposed dish-shape portion having a flat bottom and a straight side wall extending upwardly from said bottom at right angles thereto, said side wall terminating in a depending flexible skirt inclined outwardly away from the side wall to provide a tapering channel for receiving the top of the container with a wedging action, said skirt being longer than said side wall, said side wall and said bottom being of greater thickness than said skirt, the upper portion of the wall of the container being of uniform thickness and terminating in an upwardly extending free edge, the tapering channel of the cover receiving the upper portion of said container wall wherein the side wall of the cover engages the inner side of the container wall in face contacting relation and in wedging relation with respect to the tapering channel at the inner end of the flexible skirt and in spaced relation to the flexible skirt at the free end thereof, and said tapering channel arranged to receive pry-off means for facilitating the withdrawal of the cover from the container without distorting the container or the cover.

DONALD W. HILL.

REFERENCES CITED

The following references are of record in the file of this patent:

UNITED STATES PATENTS

| Number | Name | Date |
| --- | --- | --- |
| 827,667 | Reed | July 31, 1906 |
| 1,158,622 | Blakeslee | Nov. 2, 1915 |
| 1,325,930 | Drake | Dec. 23, 1919 |
| 1,456,423 | Coates | May 22, 1923 |
| 1,571,089 | Carpenter | Jan. 26, 1926 |
| 1,759,407 | Kingsbury | May 20, 1930 |
| 1,967,930 | Fox | July 24, 1934 |
| 2,120,826 | Young | June 14, 1938 |
| 2,123,022 | Pilliod et al. | July 5, 1938 |
| 2,317,884 | Clouston | Apr. 27, 1943 |
| 2,350,950 | Wiley | June 6, 1944 |
| 2,358,915 | Duthie | Sept. 26, 1944 |
| 2,487,400 | Tupper | Nov. 8, 1949 |

FOREIGN PATENTS

| Number | Country | Date |
| --- | --- | --- |
| 381,883 | Great Britain | Oct. 13, 1932 |

OTHER REFERENCES

British Plastics, February 1938.